United States Patent [19]

Arai et al.

[11] 4,400,737

[45] Aug. 23, 1983

[54] APPARATUS FOR PRODUCING AND REPRODUCING EMBEDDED PATTERN

[75] Inventors: Yoshio Arai; Hiroyuki Kataoka; Isao Suzuki; Satoru Itoh, all of Kanagawa, Japan

[73] Assignee: Fuji Xerox Co., Ltd., Tokyo, Japan

[21] Appl. No.: 281,261

[22] Filed: Jul. 8, 1981

[51] Int. Cl.³ .............................................. H04N 1/00
[52] U.S. Cl. .................................. 358/263; 358/293; 358/280; 382/16
[58] Field of Search .................... 358/263, 280, 293; 340/146.3 R, 146.3 Z, 146.3 AG

[56] References Cited

U.S. PATENT DOCUMENTS

4,229,768 10/1980 Kurahayashi ...................... 358/280

Primary Examiner—Robert L. Griffin
Assistant Examiner—Edward L. Coles
Attorney, Agent, or Firm—Sughre, Mion, Zinn, Macpeak and Seas

[57] ABSTRACT

Apparatus for producing and reproducing embedded patterns in which a character or the like including a pattern which is not observable macroscopically can be differentiated from the other formats microscopically. An input unit reads a normal original image pattern utilizing a raster scanning system. In the apparatus for producing the format, a processing unit includes a gate which receives a signal from the input means and passes or blocks the signal in accordance with the desired embedded pattern. An output unit records the image using the raster scanning system. In the apparatus for reproducing the format, a processing unit includes a gate which blocks or passes an input signal depending on whether or not it contains the embedded pattern.

15 Claims, 21 Drawing Figures

APPARATUS FOR PRODUCING AND REPRODUCING EMBEDDED PATTERN

BACKGROUND OF THE INVENTION

The present invention relates to a format with an embedded pattern, an apparatus for producing the format, and an apparatus for reproducing the format thus produced. More particularly the invention relates to a format such as a character or letter, a document, a picture, or the like in which a pattern that cannot be differentiated from other formats observed macroscopically but can be differentiated from the other format observed microscopically is embedded. The invention also relates an apparatus for producing such a format with an embedded pattern and to an apparatus for reproducing the format thus produced.

There are generally known permanent and temporary types of information to be recorded in a specified format or form. For instance, the full name, address, registration number, etc. of employees or other personnel can be permanently entered in a salary ledger or attendance record book, but the amount of salary, the amount of tax, attendance or absence, etc. temporarily filled therein and revised from time to time. At the end of each year, the full name, address and the like are manually rewritten in a new salary ledger or new attendance record book, which disadvantageously requires much effort and is attended by a great possibility of error.

To avoid this, a special overlay mask can be used which is formed to conceal the portion to be deleted or revised. The mask is superposed on the desired portion and the format or form is copied using an ordinary copying machine, thereby retaining only the permanent data and deleting or erasing the temporary data, that is, reproducing only the format or form. Although necessary time and labor can be reduced using to this method, a number of different types of overlay masks are required corresponding to the respective formats and matching of the mask to the format requires much effort resulting in a low working efficiency.

SUMMARY OF THE INVENTION

According to the present invention, a format is provided with an embedded pattern which can be differentiated from other formats by embedding a special pattern only for the information to be retained upon reproduction of the format in a double style format.

Further in accordance with the invention, there is provided an apparatus for producing a format with an embedded pattern formed as described above and an apparatus for reproducing the format thus produced.

The apparatus for producing a format with an embedded pattern includes an input unit, a processing unit and an output unit. The input unit reads a normal original image in accordance with a raster scanning system. The processing unit includes gate means for receiving an input signal from the input unit and means for controlling the gate means to prevent data of the input signal corresponding to predetermined positions of pattern read by the input unit from passing through the gate means. The output unit records an image using the same raster scanning system in accordance with an output from the processing unit.

The apparatus for reproducing a format with an embedded pattern similarly includes an input unit, a processing unit and an output unit. In this case, the processing unit includes gate means for receiving an input signal from the input unit, gate means, and means for detecting an array pattern of peripheral image elements of the input signal for each image element unit and to pass those only image elements corresponding to a predetermined embedded pattern through the gate means. The output unit records an image using the same raster scanning system as the input unit.

DESCRIPTION OF THE PREFERRED EMBODIMENTS

Figure 1A:
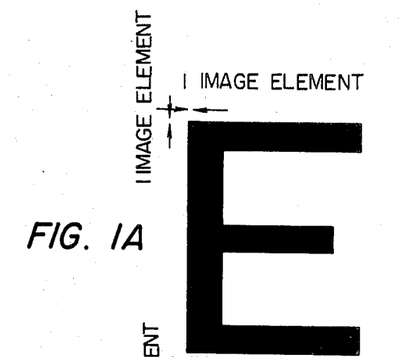
FIGS. 1, 9, 10, 12, 16 and 18 are views showing first to sixth preferred embodiments of a format with an embedded pattern formed according to the present invention.
Figure 1B:
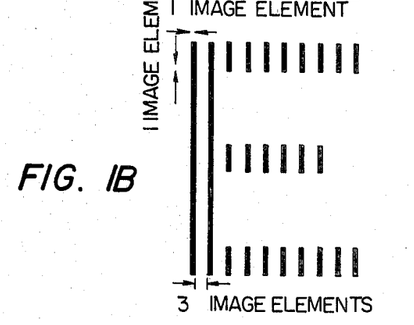
Figure 2:
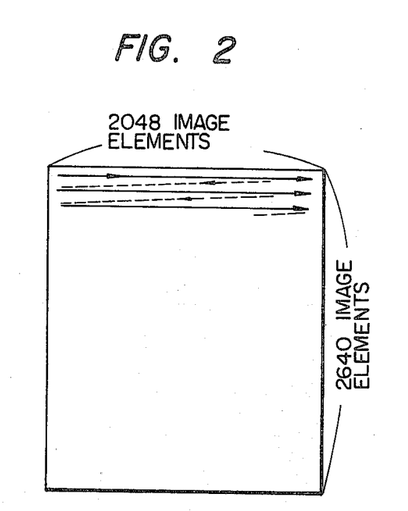
FIG. 2 is an explanatory view of a raster scanning system in an apparatus for producing a format with an embedded pattern of the invention.

FIG. 1A shows a format or character which is recorded according to an ordinary method. The character is representatively written as a normal "E" alphabetic letters. FIG. 1B shows an example of a format with an embedded pattern of the "E" as indicated in FIG. 1A according to the present invention. This example corresponds to the format which is processed by reading the letter "E" in accordance with a raster scanning system utilizing main scanning in a horizontal direction and sub scanning in a vertical direction as indicated in FIG. 2 and thereafter masking it with a pattern specified by [000100010001 ... ]. In other words, the width of one retained vertical line is an image element or a dot and the interval between the image elements or the dots corresponds to three image elements or three dots.

Figure 3:
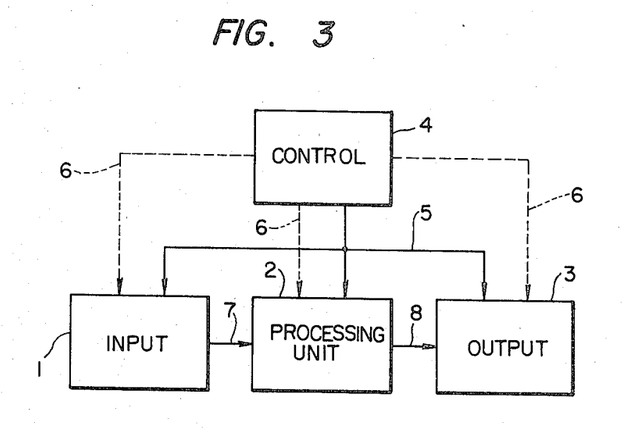
FIG. 3 is a schematic block diagram of an apparatus for producing or reproducing a format with an embedded pattern.

FIG. 3 is a schematic block diagram which shows a preferred embodiment of an apparatus for producing a format with an embedded pattern constructed according to the present invention. In FIG. 3, the apparatus includes an image input unit 1, a processing unit 2, an output unit 3 and a control unit 4.

The image elements of a format are inputted to the input unit 1, which serves to convert image elements into a binary one-dimensional time series electric signal 7 in accordance with a raster scanning system shown in FIG. 2. The input unit 1 may be a charge coupled device (CCD) or a photodiode array to the like.

The output electric signal 7 from the input unit 1 is applied to the processing unit 2, which is an essential part of the present invention, for producing a format with an embedded pattern. The processing unit 2 processes the signal 7 from the input unit 1, as will be described in greater detail, and converts the signal 7 into an output signal 8.

The output signal 8 from the processing unit 2 is then applied to the output unit 3 which converts the output binary one-bit time series signal into a normal visible image. The output unit 3 may be a known printer or the like.

The control unit 4 controls the input unit 1, the processing unit 2 and the output unit 3 in operation and applies a control signal 6 such as an initialization signal, a clear signal or the like and a clock signal 5 to the input unit 1, the processing unit 2 and the output unit 3.

The operation of the apparatus will be described, for explanatory purposes, with reference to an image to be processed which incorporates 2048 image elements laterally and 2640 image elements longitudinally, as indicated in FIG. 2, and also to the input unit 1 which employs a raster scanning system as indicated by lines with arrows in FIG. 2 at the time of inputting and outputting the image elements. The apparatus will be described first with respect to the normal production of a permanent format or form to be retained and not to be deleted or erased. An example of this part of the permanent format is indicated in FIG. 1A.

Figure 4:
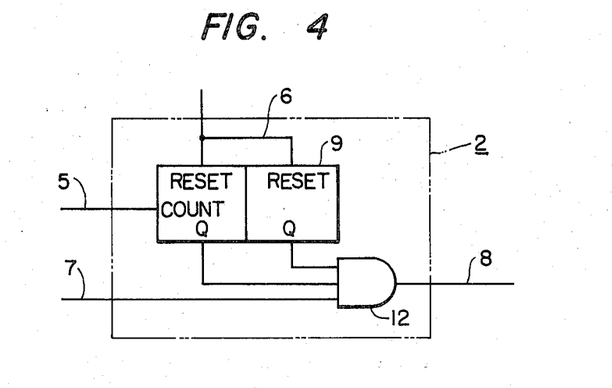
FIG. 4 is a block diagram showing a preferred embodiment of a processing unit employed in an apparatus for producing a format with an embedded pattern of the invention.

FIG. 4 shows in block form a specific arrangement of the processing unit 2 shown in FIG. 3. In FIG. 4, the processing unit 2 includes a 2-bit binary counter 9 and an AND gate 12. The binary (white and black) one-dimensional time series electric signal 7 obtained in accordance with a raster scanning system for the input unit 1 shown in FIG. 2 is applied to one input of the AND gate 12 in the processing unit 2. A control signal 6, specifically, a clear signal, from the control unit 4 is applied to the RESET input terminals of the 2-bit binary counter 9 at the starting time of scanning to thereby clear the counter 9 to "00". Thereafter, clock signals 5 are applied from the control unit 4 to the COUNT input terminal of the counter 9 which counts the clock signal 5.

The counted outputs of the counter 9 are applied from the output terminals Q of the two bit stages of the counter 9 to two corresponding inputs of the AND gate 12. When both the outputs from the output terminals Q of the counter 9 are at a high level "11", the AND gate 13 is opened. More specifically, the AND gate 12 is opened every time that 4n clock pulses (where n=1, 2, ...) are inputted to the counter 9. The signal 7 applied to the AND gate 12 is fed as an output signal 8 at that time to the output unit 3. Assuming that the relation between the clock and the image elements is set so that one clock pulse corresponds to one image element, an input image shown in FIG. 1A applied to the input unit 1 is processed through the processing unit 2 to become an image with a striped pattern as shown in FIG. 1B at the output of the output unit 3.

The striped pattern image thus processed is used as a permanent format or form. Temporary data such as letters, images or a picture is additionally written on the image or striped pattern as designated by a letter "F" in FIG. 5 or is printed thereon to be used in the same manner as the conventional permanent format or form.

Next, a preferred embodiment of an apparatus for reproducing a format with an embedded pattern of the invention will be described with reference to reproduction of only the permanent format or form from the composite format and in which data written or printed thereafter on the permanent format or form (a letter "F" in FIG. 5) is erased.

Figure 5:
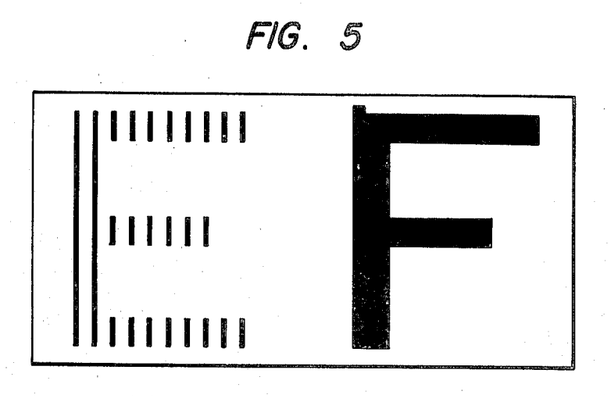
FIG. 5 is a view of an example of normal temporary data recorded on a format with an embedded pattern of the invention.
Figure 6:
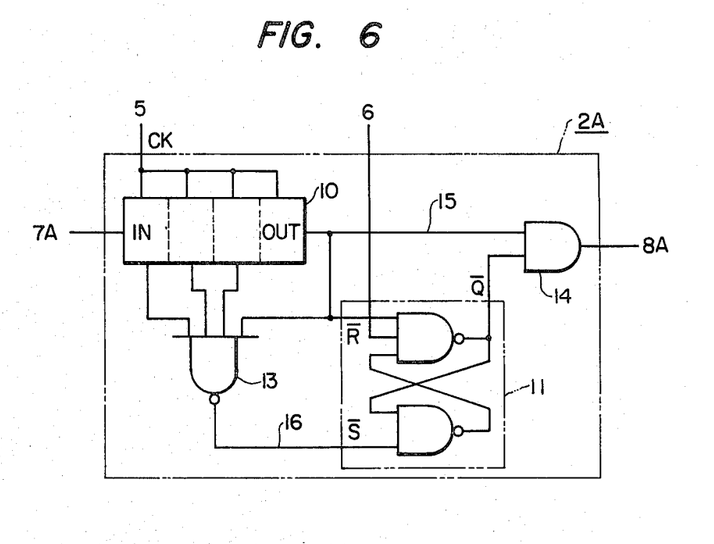
FIG. 6 is a block diagram showing a preferred embodiment of a processing unit employed in an apparatus for reprocuding a format with the embedded pattern shown in FIG. 5.

FIG. 6 shows a preferred embodiment in block diagram form of a processing unit 2A in the apparatus for reproducing a format with an embedded pattern of the invention. The processing unit 2 may be connected at the position corresponding to the processing unit 2 in FIG. 3. In FIG. 6, the processing unit 2A includes a 4-bit shift register 10, a flip-flop 11, and NAND gate 13 and and AND gate 14. The processing unit 2A is used where a striped pattern image of the permanent format is a format in which every 4n-th image element as indicated in FIG. 5 is erased.

A signal 7A read by an input unit (not shown) in accordance with a raster scanning system is applied to an IN input terminal of the 4-bit shift register 10. Clock signals 5 are applied from a control unit (not shown) to the four bit stages of the shift register 10 through terminal CK of the processing unit 2A. The input signal 7A to the shift register 10 is shifted by one bit position every time that a pulse of the clock signal 5 is applied to the shift register 10. When four consecutive input signals 7A are applied to the shift register 10 at a high level "1", four high level "1" output signals are respectively applied from the four bit stages of the shift register 10 to first to fourth inputs of the NAND gate 13. Then, the NAND gate 13 produces a low level "0" output signal 16.

When the low level "0" output signal 16 thus produced is applied to the set S terminal of the flip-flop 11, the flip-flop 11 is set and in turn produces from its output Q terminal an output of a low level "0". The low level "0" output thus produced from the flip-flop 11 is applied to one input of the AND gate 14 which is accordingly closed. The AND gate 14 thus produces an output signal of a low level "0". Thus, the output 15 from the OUT terminal of the shift register 10 is prevented from passing through the AND gate 14. This state is retained until the flip-flop 11 is reset so that the AND gate 14 is opened.

The flip-flop 11 is retained in a set state until the low level "0" input signal 7A to the IN input terminal of the shift register 10 is shifted through the four bit stages of the shift register 10 to the most significant bit stage of the shift register 10 and accordingly the OUT output terminal of the shift register 10 while the AND gate 14 remains closed. When the low level "0" input signal 7A is shifted to the most significant bit stage of the shift register 10 and appears at the OUT output terminal, the "0" signal 7A is in turn applied to the reset R terminal of the flip-flop 11 whereupon the flip-flop 11 is reset and in turn produces from its output Q terminal an output of a high level "1". The high level "1" output thus produced is in turn applied to the corresponding input of the AND gate 14 which is thus opened.

If three or less consecutive input electric signals 7A are applied to the shift register 10 at the high level "1", the signals 7A will be insufficiently shifted through the four bit stages of the shift register 10. Thus, as less than four high level "1" signals are applied to the four inputs of the NAND gate 13, it does not produce a low level "0" output signal 16 to the set S terminal of the flip-flop 11 so that the flip-flop 11 is not thus set. Accordingly, the flip-flop 11 does not produce from its output Q terminal an output of a low level "0" to the corresponding input of the AND gate 14 which is thus not closed. Thus, the output 15 from the OUT terminal of the shift register 10 will pass through the AND gate 14 which in turn produces an output signal 8A. Therefore, four or more consecutive "1" input electric signals 7A are thus prevented from passing through the AND gate 14 and are thus erased in the processing unit 2A, but three or less consecutive "1" input signals 7A are thus passed through the AND gate 14 which thus produces an output signal 8A.

Figure 7:
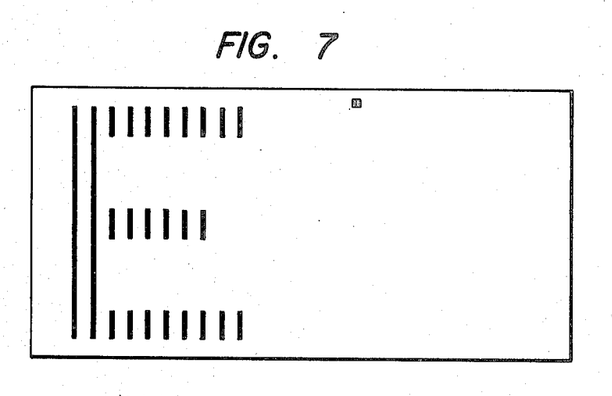
FIG. 7 is a block diagram showing a preferred embodiment of a format with an embedded pattern reproduced by the processing unit contained in the apparatus for reproducing the format shown in FIG. 6.

When the input signal 7A is thus processed in the processing unit 2A, the letter "F" in FIG. 5, i.e. a temporary type of information or data, is erased in the processing unit 2A and only the permanent data or format is retained. However, if the letter "F" incorporates a black spot, for example, at the the upper left portion of the letter "F" as shown in FIG. 5, when the letter "F" is processed in the processing unit 2A in FIG. 6, the spot does not produce four consecutive input signals of a high level "1" in the input unit (not shown). Accordingly, the spot will not be erased but will be retained as noise as indicated in FIG. 7.

Figure 8:
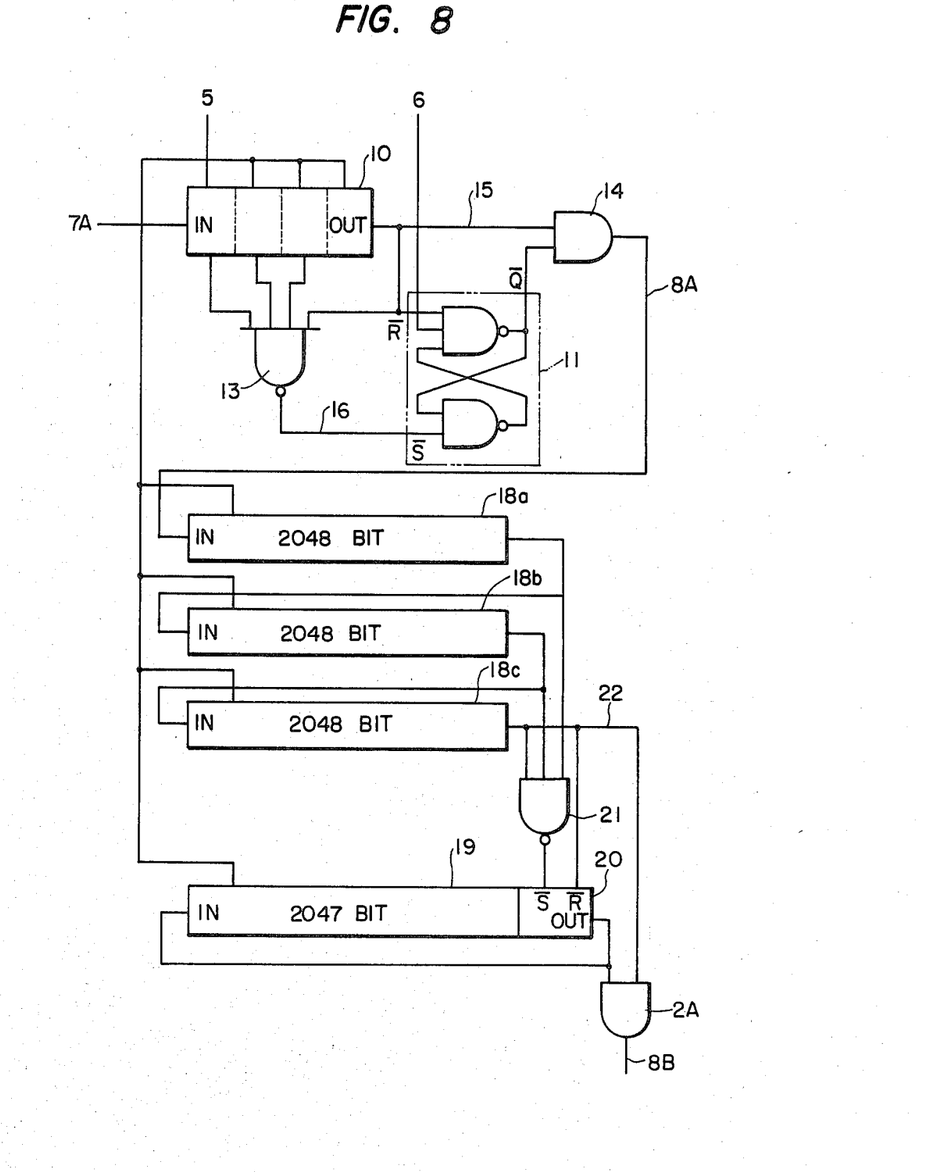
FIG. 8 is a block diagram showing another preferred embodiment of a processing unit for eliminating noise shown in FIG. 7.

Another preferred embodiment of a processing unit in an apparatus for reproducing a format with an embedded pattern will be described as indicated in FIG. 8 in which this difficulty is eliminated. In this embodiment, as shown in the lower half of the circuit diagram of FIG. 8, a circuit for reading longitudinal consecutive input signals of a high level "1" is added to the arrangement of the embodiment shown in FIG. 6.

In FIG. 8, the output signal 8A produced at the output of the AND gate 14 is applied to the IN input terminal of a first 2048-bit shift register 18a, the bits of which generally correspond to the number of bits contained in one scanning of an orginal format or form. The output of the shift register 18a is serially applied in turn to the IN input terminal of a 2048-bit shift register 18b, and the output of the shift register 18b is serially applied in turn to the IN input terminal of a 2048-bit shift register 18c. Thus, the 2048-bit shift registers 18a through 18c are connected in series with each other. Further, the outputs from the most significant bit stages of the respective shift registers 18a through 18c are respectively applied to first to third inputs of an NAND gate 21. The NAND gate 21 produces a low level "0" output signal only upon reception of three high level "1" output signals from the three shift registers 18a through 18c.

The output signal thus produced from the AND gate 21 is applied to the S set input terminal of the most significant bit stage of a 2047-bit gate signal shift register 19. Clock signals 5 are applied from a control unit (not shown) to the respective shift registers 18a through 18c and 19 in the same manner as the shift register 10.

When an image of a letter "F" as indicated in FIG. 7 is read in accordance with a raster scanning system as described above, the image elements from the respective scans are passed through the AND gate 14 and are sequentially passed through all the 2048-bit shift registers 18a through 18c, which thus will produce high level "1" output signals to the three inputs of the NAND gate 21. Accordingly, the NAND gate 21 thus produces a low level "0" output signal to the S set input terminal of the most significant bit stage of the shift register 19, which produces in turn on its OUT output terminal an output of a high level "1" to one input of the AND gate 24 which is thus opened. Accordingly, when more than three consecutive signals of the image elements pass through the shift registers 18a through 18c at a high level "1", the NAND gate 21 thus produces a low level "0" output to the most significant bit stage of the shift register 19 and a high level "1" output is applied from the shift register 19 to the AND gate 24. Thus, the AND gate 24 is opened. In addition, the output signal 22 from the most significant bit stage of the third shift register 18c is applied to the other input of the AND gate 23, which in response produces an output 8B of a high level "1" image element.

When an irregular spot of the letter "F" as indicated in FIG. 7 is read in the same manner as above, less than three consecutive signals pass through the shift registers 18a through 18c so that the third shift register 18c produces a low level "0" output signal to the NAND gate 20 and also to the other input of the AND gate 24. Thus, the low level "0" output from the shift register 18c is also applied to the R reset input terminal 20 of the most significant bit stage of the shift register 19, which is thus reset and produces at its OUT terminal a low level "0" output to the corresponding input of the AND gate 24 which thus closed. Thus, the AND gate 24 prevents the signal corresponding to the spot from passing. The low level "0" output from the OUT terminal of the most significant bit stage of the shift register 19 is also applied to the IN input terminal of the shift register 19 at the least significant bit stage.

When two or fewer consecutive signals of a spot or similar noise is read and processed through the processing unit shown in FIG. 8, the AND gate 24 will eventually close, and the signal of the spot or noise is thus prevented from passing through the AND gate 24. Thus, the noise which is retained using the processing unit shown in FIG. 6 is eliminated and erased from the output image elements in this embodiment.

It is noted that the foregoing description is directed to an example of a format with an embedded pattern in which a striped pattern is used for the permanent format or form. However, thw width of the image element and the interval between the image elements, i.e., a duty ratio, can be set as desired.

Figure 9:
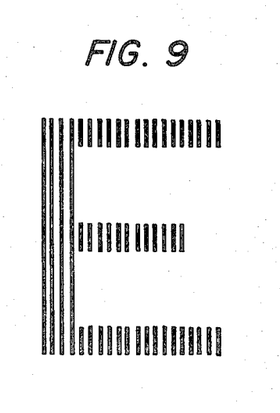

Another preferred embodiment of a format with an embedded pattern is indicated in FIG. 9 in which the width of the striped pattern and the interval between the image elements are used as an image element in the embedded pattern.

In order to produce and reproduce such a format with an embedded pattern, it is apparent from the foregoing description that the counter 9 in FIG. 9 employs a 1-bit counter and the shift register in FIG. 6 employs a 2-bit shift register.

Figure 10:
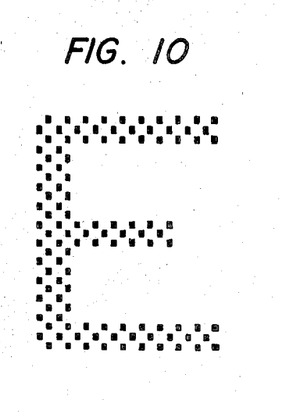

Yet another preferred embodiment of a format with an embedded pattern of the invention is shown in FIG. 10. As apparent from FIG. 10, the character "E" is encoded with a pattern of [0001000100010 . . . ] with black occurring at (4n+2)-th bit position of a scanning line of an image element and with a pattern of [010001000100 . . . ], where (n=0, 1, 2, . . . ) with black occurring at the (4n+4)-th bit positions of a scanning line of an image element. Such a pattern does not have directivity, and the format is quite easy to employ.

Figure 11:
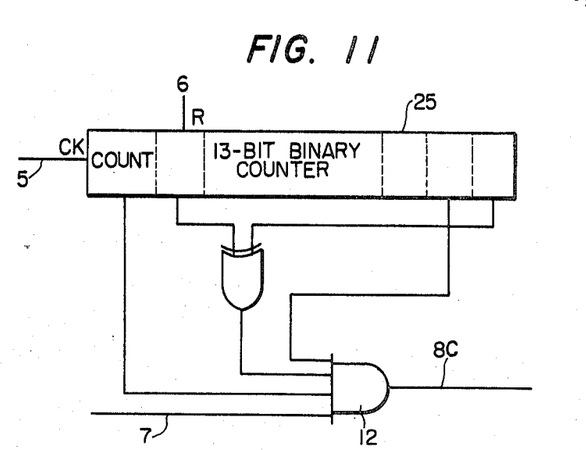
FIG. 11 is a block diagram showing another preferred embodiment of a processing unit for producing an embedded pattern shown in FIG. 10.

Another preferred embodiment of an apparatus for producing such a format with an embedded pattern will be described with a processing unit 2 as shown in FIG. 3. In FIG. 11, the processing unit includes a 13-bit binary counter 25, an exclusive OR gate and an AND gate 12. It is assumed that an image 7 for a permanent format as indicated in FIG. 1A is applied to one input of the AND gate 12 and that one scanning lines has $2048 = 2^{11}$ bits as shown in FIG. 2.

As an input unit (not shown) reads the image scanning line by scanning line, the eleven bit signals are shifted and filled into the lower 11 bits stages of the 13-bit binary counter 25. Accordingly, the output of the most significant bit stage of the counter 25 repeatedly produces low and high level output signals "0" and "1" at alternate scanning lines. More specifically, the output of the most significant bit stage of the counter 25 is at a high level "1" at third, fourth, seventh, eighth, eleventh, twelfth, . . . scanning lines of the image elements. The second most significant bit stage of the counter 25 repeatedly outputs low and high level signals "0" and "1" for alternate scanning lines. That is, the output of the second most significant bit stage of the counter 25 is at a high level "1" for odd number scanning line and at a low level "0" for even number scanning line.

Both the outputs from the second most significant bit stage and the least significant bit stage are applied to the two inputs of the exclusive OR gate. The output from the most significant bit stage of the counter 25 is applied to another input of the AND gate 12. The output from the exclusive OR gate is applied to the third input of the AND gate 12, and the output from the second least significant bit stage of the counter 25 is applied to the fourth input of the AND gate 12. Accordingly, the AND gate 12 is closed for every other scanning line. When the AND gate 12 is closed the input signal 7 to the first input of the AND gate 12 is prevented from passing through the AND gate 12. When the output from the second most significant bit stage of the counter 25 is at a high level "1" as described above, the AND gate 12 is opened or closed in accordance with the outputs from the exclusive OR gate and the least significant bit stage.

In the embodiment shown in FIG. 10, assuming that n and m=0, 1, 2, 3, . . . , the gate 12 is opened for scanning lines number 2(2n+1) when the number 4(m+1) image elements are read by the input unit (not shown) and applied to the processing unit as indicated in FIG. 11, while the gate 12 is also opened, for the number 4(n+1) scanning lines when the 2(2m+1) image elements are read by the input unit (not shown) and are applied to the processing unit. More particularly, the AND gate 12 is opened for every four bits with the output inverted at every other scanning line. As a consequence, when the image shown in FIG. 1A is read by an apparatus employing the processing unit shown in FIG. 11 and is processed through the AND gate 12, the format is changed to a spot-like embedded pattern as shown in FIG. 10.

Figure 12:
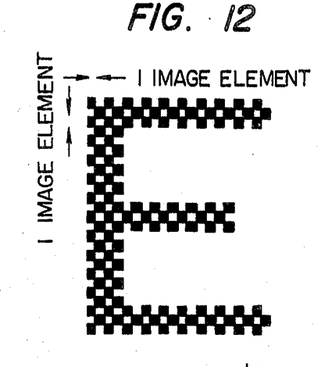

A further preferred embodiment of a format with an embedded pattern is shown in FIG. 12. The pattern shown in FIG. 12 is composed of white and black portions alternating in a checkerboard pattern.

Figure 13:
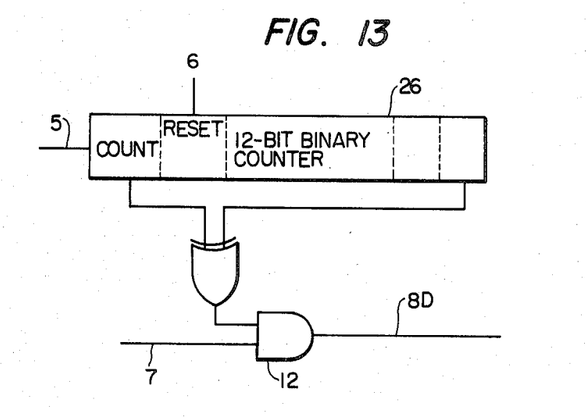
FIG. 13 is a block diagram showing a preferred embodiment of a processing unit for producing the pattern shown in FIG. 12.

The format of the embodiment shown in FIG. 12 can be obtained by an apparatus for producing a format with an embedded pattern which employs, for example, a processing unit as shown in FIG. 13. In FIG. 13, the processing unit includes a 12-bit binary counter 26, an exclusive OR gate and an AND gate 12. Outputs from the most and least significant bit stages of the counter 26 are applied to the two inputs of the exclusive OR gate, and the output from the exlusive OR gate is applied to one input of the AND gate 12. The input signals 7 from image elements are applied to the other input of the AND gate 12. Accordingly, the AND gate 12 is opened for every other scanning line of the image elements. Thus, the normal image shown in FIG. 1A is processed through the processing unit shown in FIG. 13 to an image with an embedded pattern as shown in FIG. 12.

These formats can be reproduced by an apparatus which employs the processing unit as indicated in FIG. 6. However, noise cannot be eliminated or erased by an apparatus which employs the processing unit of FIG. 8.

Figure 14:
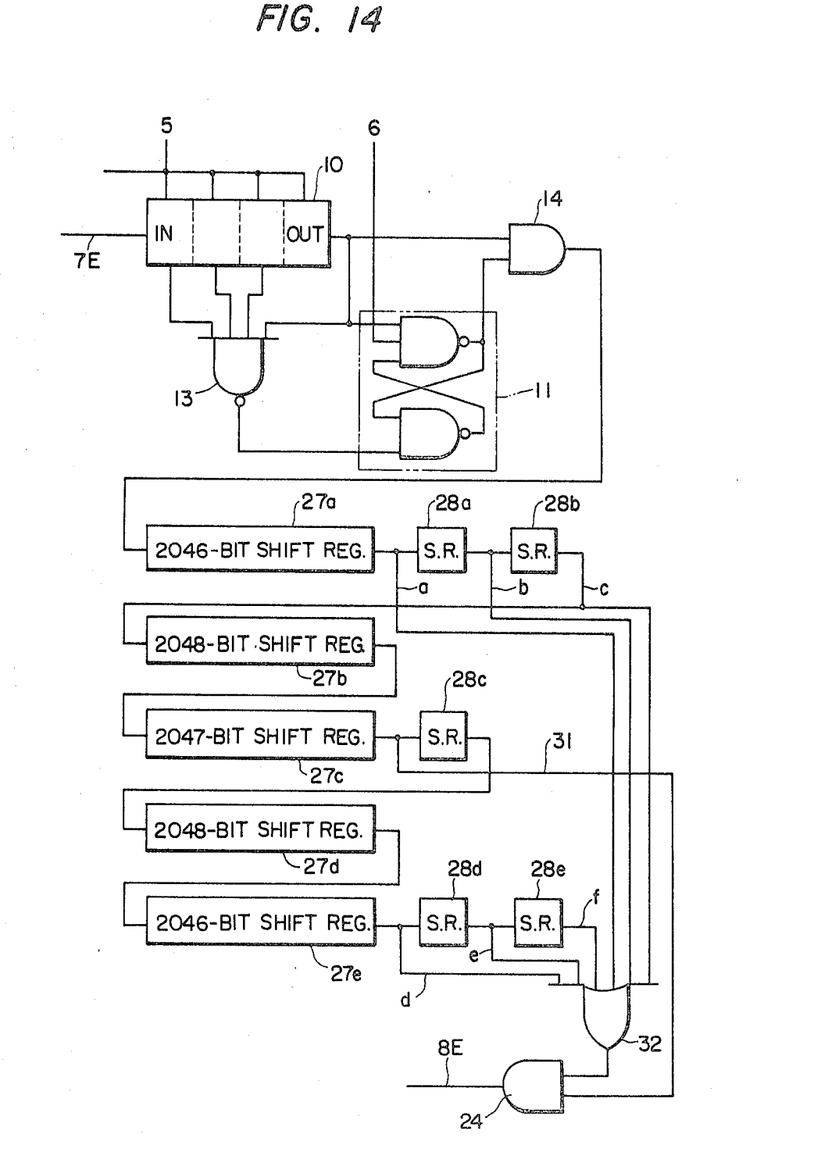
FIG. 14 is a block diagram showing a preferred embodiment of a processing unit for reproducing the embedded pattern shown in FIG. 10.

Still another preferred embodiment of an apparatus for reproducing a format with an embedded pattern shown in FIG. 10 employing a processing unit for reproducing the format with the pattern shown in FIG. 10 will be described with reference to FIG. 14. In FIG. 14, a circuit arrangement for eliminating or erasing noise is added to the arrangement of the embodiment shown in FIG. 6.

In FIG. 14, the output signal from the AND gate 14 is applied to the input terminal of a 2046-bit first shift register 27a. The output a from the shift register 27a is in turn applied to the input of a 1-bit shift register (or flip-flop) 28a and also to one input of an OR gate 32. The output b from the shift register 28a is applied to the input of a 1-bit shift register 28b. Here, 2048 bits corresponds to the number of bits contained in one scanning line of an original format or image in the same manner as described with respect to the previous embodiments. The output b of the shift register 28a is also applied to the second input of the OR gate 32. The output c of the shift register 28b is applied to a 2048-bit second shift register 27b. The output from the shift register 27b is applied to the input terminal of 2047-bit third shift register 27c. The output 31 of the shift register 27b is applied to the fourth input of the OR gate 32. The output from the shift register 28c is applied to the input of 2048-bit fourth shift register 27d. The output form the shift register 27d is in turn applied to the input of a 2046-bit fifth shift register 27e. The output d from the shift register 27e is applied to the input of a 1-bit shift register 28d and also to the fourth input of the OR gate 32. The output e from the shift register 28d is applied to the input of a 1-bit shift register 28e and also to the fifth input of the OR gate 32. The output f from the shift register 28e is then applied to the sixth input of the OR gate 32.

Figure 15:
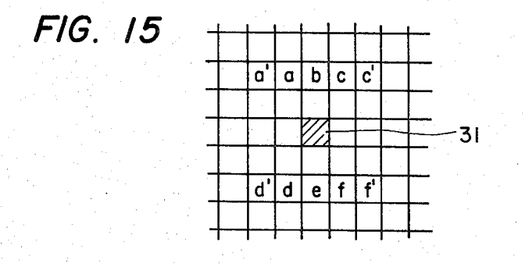
FIG. 15 is a view for describing the operation of the arrangement shown in FIG. 14.

As apparent from the arrangement shown in FIGS. 14 a and 15, three upper bit positions a through c and three lower bit positions d through f of a bit image element signal 31 are detected to determine whether the respective bit positions should be outputted or not. The information corresponding to the positions a through f is applied to the OR gate 32 which controls the opening and closing of an AND gate 24 so as to thereby determine whether the bit image element signal 31 is a correct image element signal of the embedded pattern or noise.

More specifically, if at least one high level "1" is contained in the six bits, the signal 31 is regarded as a correct signal of an image element and is consequently outputted through the AND gate 24. However, if none of the six bits is at a high level "1", the signal 31 is regarded as noise and it is not outputted through the AND gate 24 which is then closed so as to eliminate or erase noise in the pattern.

The output of the OR gate 32 is in turn applied to one input of the AND gate 24, and the signal 31 is thus applied to the other input of the AND gate 24. If any of these six bits becomes a high level "1", the signal 31 is passed through the AND gate 24 as an output 8e of an image element of the pattern of the format or image. It is noted that the six bit positions a through f shown in FIG. 15 may also be used to similarly erase noise contained in the pattern.

Figure 16:
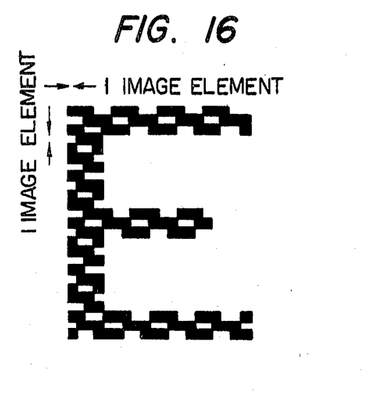
Figure 17:
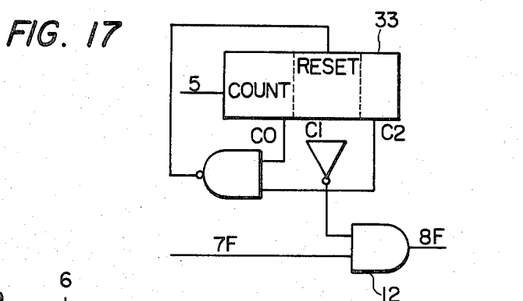
FIG. 17 is a block diagram showing a preferred embodiment of a processing unit for producing the embedded pattern shown in FIG. 16.

Still another preferred embodiment of a format with an embedded pattern is shown in FIG. 16 and a preferred embodiment of a processing unit for producing such a format is shown in FIG. 17. In FIG. 17, the processing unit includes a modulo-5 counter 33, an NAND gate, an inverter and an AND gate 12. The truth table of the modulo-5 counter 33 is shown below.

TABLE 1

| Clock 5 | C2 | C1 | C0 |
|---|---|---|---|
| 5n | 0 | 0 | 0 |
| 5n + 1 | 0 | 0 | 1 |
| 5n + 2 | 0 | 1 | 0 |
| 5n + 3 | 0 | 1 | 1 |
| 5n + 4 | 1 | 0 | 0 |

Clock signals 5 are applied from a control unit (not shown) to the COUNT input of the counter 33. The output C0 from the first bit counting stage of the counter 33 is applied to the NAND gate. The output C1 from the second bit counting stage of the counter 33 is applied to the input of the inverter, the output of which is connected to one input of the AND gate 12. The output C2 from the third bit counting stage of the counter 33 is applied to the other input of the NAND gate, the output of which is connected to the RESET input of the counter 33. An input signal of an image element 7F is applied to the other input of the AND gate 12.

As evident from the above Table 1, the output C1 from the second counting stage of the counter 33 becomes a high level "1" during the consecutive bit times for every five clock pulses and a low level "0" for three consecutive bits for every five clock pulses. Accordingly, as the inverted output from the inverter is applied to one input of the AND gate 12, the AND gate 12 is controlled thereby to produce an output 8F of a mask pattern of [1110011100 . . . ]. Further, since the total number of bits 2048 of one scanning line cannot be exactly divided by 5, the above pattern is displaced at every scanning line. Thus, the pattern as a whole will, for example, be as indicated in FIG. 16. It is noted from the foregoing description that this pattern can be reproduced by the arrangement shown in FIG. 14.

Figure 18:
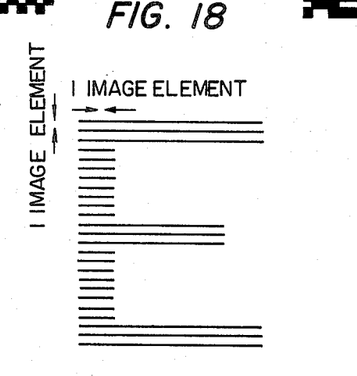
Figure 19:
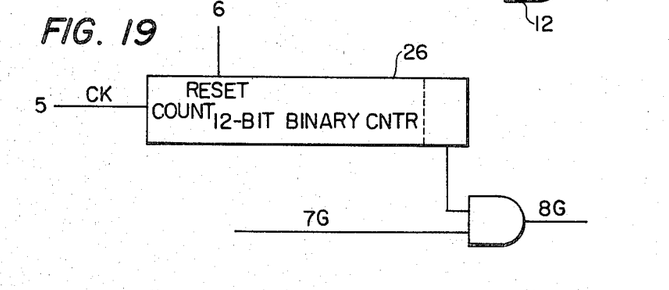
FIG. 19 is a block diagram showing a preferred embodiment of a processing unit for producing the embedded pattern shown in FIG. 18.

Still another preferred embodiment of a format with an embedded pattern is shown in FIG. 18. This pattern can be produced by erasing every other scanning line of an image in the same manner as described above. Further, a processing unit for producing the format with the embedded pattern shown in FIG. 18 is shown in FIG. 19. In addition, a still another preferred embodiment of an apparatus for reproducing the format shown in FIG. 18 is shown in FIG. 20 in which the lateral processing and the longitudinal processing of the image are exchanged with respect to the circuit arrangement of the apparatus for reproducing the format shown in FIG. 8.

In FIG. 19, the processing unit includes a 12-bit binary counter 26 and an AND gate. Clock signal pulse CK from a control unit (not shown) are applied to the input terminal of the counter 26. A control or clear signal 6 is applied to the RESET input of the counter 26. The least significant bit counting stage is connected to one input of the AND gate and an input signal of an image element 7G is applied to the other input of the AND gate. The AND gate is controlled by the level of the output from the least significant counting stage of the counter 26.

Figure 20:
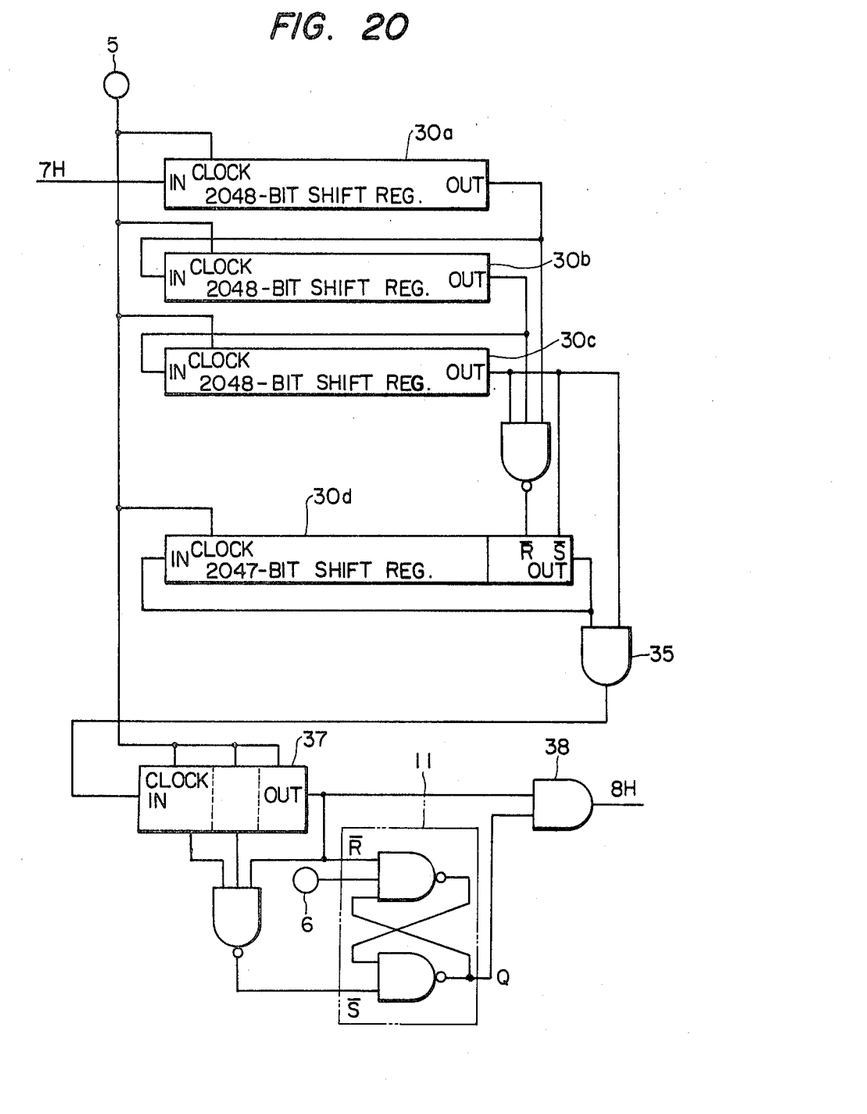
FIG. 20 is a block diagram showing a preferred embodiment of a processing unit for producing the embedded pattern shown in FIG. 18.

In FIG. 20, as apparent from a comparison with the arrangement shown in FIG. 8, the portion of the processing unit shown in the upper part of FIG. 20 determines whether or not the input signal 7H incorporates more than three longitudinally consecutive high level "1" bits in the same manner as the c circuit shown in the lower half of FIG. 8. When the input signal 7H contains more than three longitudinally consecutive high level "1" bits, and AND gate 35 is eventually closed in the same manner as in the arrangement shown in FIG. 8. Further, the circuit shown in the lower half of FIG. 20 determines whether or not the input signal 7H of the image elements incorporates more than three laterally consecutive high level "1" bits in the same manner as in the arrangement shown in FIG. 8. When the input signal 7H contains more than three laterally consecutive high level "1" bits, the AND gate 38 is eventually opened in the same manner as in the arrangement shown in FIG. 8 to thereby allow the AND gate 38 to pass the input signal. When the input signal 7H does not contain more than three laterally consecutive high level "1" bits, the AND gate 38 is consequently closed in the same manner as described above to thereby prevent the noise portion of the input signal from passing through.

It is noted that the foregoing description is directed to examples of processing units employed in the apparatus for producing and reproducing a format with an embedded pattern. The numbers of the stages in the aforementioned shift registers and counters are not fixed but are variable in accordance with variations in the duty ratio of the embedded pattern and in the sensitivity for elimination of noise.

It is also noted that the foregoing description is directed to examples of the processing units employed in an apparatus for producing and reproducing a format with an embedded pattern in which discrete logic elements are employed. The invention may also be practiced with a computer, including a microcomputer, in the same manner as was described before with more flexibility.

It may be appreciated from the foregoing description, that since in the production and reproduction of a format with an embedded pattern, permanet data and erasable temporary data can be mechanically readily identified using the present invention, the format may be exactly and simply reproduced or erased as desired whether it is permanent data or erasable temporary data.

What is claimed is:

1. An apparatus for producing a format with an embedded pattern comprising:
   an input unit for reading normal original image patterns in accordance with a raster scanning system;
   a processing unit having gate means for receiving an input signal from said input unit and means for controlling said gate means to prevent data of the input signal corresponding to a first plurality of predetermined positions at repeated intervals of a pattern being read by said input unit from passing through said gate means and to permit data of the input signal corresponding to a second plurality of predetermined positions interleaved with said positions of said first plurality of positions to pass through said gate means; and
   an output unit for recording an image by the same raster scanning system as said raster scanning system in accordance with an output from said processing unit.

2. The apparatus for producing a format with an embedded pattern of claim 1 wherein said processing unit comprises an AND gate and a binary counter having at least two output bits, said output bits being coupled to corresponding inputs of said AND gate and said AND gate having an input coupled to receive said input signal.

3. The apparatus for producing a format with an embedded pattern of claim 2 wherein said counter has two output bits and a reset input coupled to a source of reset pulses.

4. The apparatus for producing a format with an embedded pattern of claim 1 wherein said processing unit comprises a binary counter having at least four output bits; an AND gate; and an inclusive-OR gate, said AND gate having a first input coupled to a next-to-the-most-significant-bit output of said counter, said second input coupled to a least significant bit output of said counter, and a third input coupled to receive said input signal, said exclusive-OR gate having a first input coupled to a most significant bit output of said counter and a second input coupled to a next-to-the-least-significant-bit output of said counter and an output coupled to a fourth input of said AND gate.

5. The apparatus for producing a format with an embedded pattern of claim 4 wherein said counter is a thirteen-bit counter.

6. The apparatus for producing a format with an embedded pattern of claim 1 wherein said processing unit comprises a binary counter having a plurality of output bits; an exclusive-OR gate having a first input coupled to a least significant bit output of said counter and a second input coupled to a most significant bit output of said counter; and an AND gate having a first input coupled to an output of said exclusive-OR gate and a second input coupled to receive said input signal.

7. The apparatus for producing a format with an embedded pattern of claim 6 wherein said counter is a twelve-bit counter.

8. The apparatus for producing a format with an embedded pattern of claim 1 wherein said processing unit comprises a three-bit binary counter; a NAND gate having a first input coupled to a least significant bit output of said counter, a second input coupled to a most significant bit output of said counter and an output coupled to a reset input of said counter; an inverter having an input coupled to an intermediate bit output of said counter; and an AND gate having a first input coupled to an output of said inverter and a second input coupled to receive said input signal.

9. The apparatus for producing a format with an embedded pattern of claim 1 wherein said processing unit comprises a twelve-bit binary counter and an AND gate having a first input coupled to a most significant bit output of said counter and a second input coupled to receive said input signal.

10. An apparatus for reproducing a format with an embedded pattern comprising:
    an input unit for reading an original image containing an image with an embedded pattern comprising a plurality of image elements in accordance with a raster scanning system;
    a processing unit having gate means for receiving an input signal from said input unit and means for controlling said gate means to detect an array pattern of peripheral image elements of said input signal for each said image element unit and to pass only image elements corresponding to a predetermined embedded pattern having image elements at and only at a plurality of repeated intervals through said gate means; and
    an output unit for recording an image by the same raster scanning system as said raster scanning system in accordance with an output from said processing unit.

11. The apparatus for reproducing a format with an embedded pattern of claim 10 wherein said processing unit comprises a shift register having plurality of output bits; an AND gate having inputs coupled to corresponding outputs of said shift register; a set-reset flip-flop having a reset input coupled to an end bit of said shift register and a set input coupled to an output of said first AND gate; and a second AND gate having a first input coupled to said end bit of said shift register and a second input coupled to an inverted output of said set-reset flip-flop.

12. The apparatus for reproducing a format with an embedded pattern of claim 10 wherein said processing unit comprises a four-bit shift register; a first NAND gate having first through fourth inputs coupled to respective first through fourth bit outputs of said shift register; a set-reset flip-flop comprising a second NAND gate having a first input coupled to an end output bit of said shift register and a second input coupled to a source of reset pulses and a third NAND gate having a first input coupled to an output of said second NAND gate, a second input coupled to an output of said first NAND gate and an output coupled to a third input of said second NAND gate; and an AND gate having a first input coupled to said end bit of said shift register and a second input coupled to said output of said second NAND gate.

13. The apparatus for reproducing a format with an embedded pattern of claim 12 further comprising a noise cancellation circuit coupled to an output of said AND gate comprising first through fourth shift registers, each of said shift registers having a bit length corresponding to the number of image elements in a scanning line of said raster scanning system, said first through third shift registers being coupled in series with each other; a NAND gate having first through third inputs coupled to respective outputs of said first through third shift registers and an output coupled to a set input of an end bit position of said fourth shift register, a reset input of said end bit position of said fourth shift register being coupled to said output of said third shift register; and a second AND gate having a first input coupled to said output of said third shift register and a second input coupled to an output and an input of said fourth shift register, an input of said first shift register being coupled to an output of said first-mentioned AND gate.

14. The apparatus for reproducing a format with an embedded pattern of claim 10 wherein said processing unit further comprises a first shift register having a bit length corresponding to two less than the number of image elements in one scanning line of said raster scanning system; a one-bit second shift register having an input coupled to an output of said first register; a one-bit third shift register having an input coupled to an output of said second shift register; a fourth shift register having a bit length corresponding to said number of image elements in one scanning line having an input coupled to an output of said third shift register; a fifth shift register having a bit length corresponding to one less than said number of image elements in one scanning line having an input coupled to an output of said fourth shift register; a one-bit sixth shift register having an input coupled to an output of said fifth shift register; a seventh shift register having a bit length corresponding to said number of image elements in one scanning line having an input coupled to an output of said six shift register; an eighth shift register having a bit length corresponding to two less than said number of image elements in one scanning line having an input coupled to an output of said seventh shift register; a one-bit ninth shift register having an input coupled to an output of said eighth shift register; a one-bit tenth shift register having an input coupled to an output of said ninth shift register; an OR gate having first through sixth inputs coupled, respectively, to outpus of said first, second, third, eighth, ninth and tenth shift registers; and a second AND gate having a first input coupled to an output of said OR gate and a second input coupled to said output of said fifth shift register.

15. The apparatus for reproducing a format with an embedded pattern of claim 12 wherein said processing unit further comprises first through fourth shift registers, each of said first through fourth shift registers having a number of bit positions corresponding to said number of image elements in one scanning line, said first through third shift registers being coupled in series with one another, an output of said fourth shift register being coupled to an input of said fourth shift register; a fourth NAND gate having first through third inputs coupled to corresponding outputs of said first through third shift registers, an output of said fourth NAND gate being coupled to a reset input of a end bit position of said fourth shift register and a set input of said end bit position of said fourth shift register being coupled to said output of said third shift register; and a second AND gate having a first input coupled to said output of said third shift register and a second input coupled to said input and said output of said fourth shift register, an output of said second AND gate being coupled to an input of said four-bit shift register.

* * * * *